United States Patent
Iwasaki

(10) Patent No.: US 9,492,769 B2
(45) Date of Patent: Nov. 15, 2016

(54) DISK FILTER AND FILTER DISK USED FOR SAME

(71) Applicant: Enplas Corporation, Saitama (JP)

(72) Inventor: Mike Iwasaki, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 14/405,200

(22) PCT Filed: Jun. 4, 2013

(86) PCT No.: PCT/JP2013/003508
§ 371 (c)(1),
(2) Date: Dec. 3, 2014

(87) PCT Pub. No.: WO2013/183285
PCT Pub. Date: Dec. 12, 2013

(65) Prior Publication Data
US 2015/0144546 A1    May 28, 2015

(30) Foreign Application Priority Data

Jun. 4, 2012  (JP) .................. 2012-127024

(51) Int. Cl.
*B01D 29/46*  (2006.01)
*B01D 29/56*  (2006.01)
*B01D 29/90*  (2006.01)
*B01D 29/92*  (2006.01)

(52) U.S. Cl.
CPC .............. *B01D 29/56* (2013.01); *B01D 29/46* (2013.01); *B01D 29/908* (2013.01); *B01D 29/925* (2013.01); *B01D 2201/0415* (2013.01)

(58) Field of Classification Search
CPC .... B01D 29/56; B01D 29/46; B01D 29/925; B01D 29/908; B01D 2201/0415
See application file for complete search history.

(56) References Cited

U.S. PATENT DOCUMENTS

| 3,195,730 A | * | 7/1965 | Muller | ................... | B01D 29/46 210/488 |
| 4,753,731 A | * | 6/1988 | Drori | ..................... | B01D 29/46 210/488 |
| 2011/0006018 A1 | | 1/2011 | Ben-Horin et al. | | |

FOREIGN PATENT DOCUMENTS

| JP | 59-218298 A | 12/1984 |
| JP | 03-047505 A | 2/1991 |
| JP | 2004-181272 A | 7/2004 |
| JP | 2011-515206 A | 5/2011 |

* cited by examiner

*Primary Examiner* — Thomas M Lithgow
(74) *Attorney, Agent, or Firm* — Brundidge & Stanger, P.C.

(57) ABSTRACT

A disk filter (21) has grooves (211) having a curved shape whose curvature gradually increases from the outer peripheral side of the filter disks (21) to the inner peripheral side thereof. The width (Wout) is greater than the width (Win). The width (Wout) is the width of an opening (211a) of each of the grooves (211), the width (Win) is the width of the opening (211a) of each of the filter disks (21). The disk filter includes, in a flow passage for liquid thereof, a stacked body composed of the filter disks (21). The pressure loss of the disk filter (21) is low and the opening ratio thereof is high. The disk filter (21) can appropriately and efficiently filtrate even a low-pressure liquid.

8 Claims, 9 Drawing Sheets

DISK FILTER AND FILTER DISK USED FOR SAME

TECHNICAL FIELD

The present invention relates to a disk filter and a filter disk used for the disk filter, and in particular to a disk filter suitable for filtration of liquid and a filter disk used for the disk filter.

BACKGROUND ART

Conventionally, a so-called disk filter has been employed to filter water for various uses such as irrigation.

The disk filter has a configuration in which a plurality of plate-shaped annular filter disks are housed in a filter case such that the filter disks are fitted around the outer periphery of a center shaft and are vertically stacked on one another.

The front surface and the rear surface of each filter disk are provided with grooves extending from the outer end (outer periphery) toward the inner end (inner periphery) in the radial direction. With such grooves, water channels (water introduction paths) are defined between the groove on the front surface of the first filter disk and the rear surface of the second filter disk when the first filter disk and the second filter disk are stacking on each other, for example.

In addition, the filter case includes an inlet from which water supplied from the water source enters, and an outlet from which filtered water is output to a supply destination (downstream side).

In the disk filter, at the time when water having entered the filter case from the inlet flows into the channels defined by the grooves of the filter disks, foreign matters in the water are captured at the peripheral surfaces or channels of the filter disks, and thus the water is filtered.

Such a disk filter is disclosed in PTL 1 for example.

However, the shape of the groove of the disk filter disclosed in PTL 1 is a straight shape. Therefore, the aperture ratio on the outer periphery side of the filter disk is smaller than the aperture ratio on the inner periphery side of the filter disk. Here, the aperture ratio is the ratio of the total area of all opening parts of the grooves on the outer peripheral surface or the inner periphery surface of the filter disk, with respect to the virtual total area of the outer peripheral surface or the inner periphery surface provided with no groove.

With such a configuration, when the water supplied to the disk filter from the water source side flows into the channel defined by the groove from the outer periphery side of the filter disk (that is, the outer peripheral surface of the filter disk is used as a surface for capturing foreign matter), the water cannot readily flow into the channel.

Accordingly, the disk filter disclosed in PTL 1 has a problem that the hydraulic pressure has to be increased by using a high pressure pump on the water source side to appropriately perform filtration.

Examples of the method for increasing the aperture ratio on the outer periphery side of the filter disk include, for example, a method in which the width of the groove is increased from the inner periphery side toward the outer periphery side of the filter disk, and a method in which the depth of the groove is increased from the inner circumference side toward the outer periphery side.

However, in the former method, the width of the groove gradually increases from the inner circumference side toward the outer periphery side. As a result, with the former method, large foreign matters easily enter the channel, degrading the filtration performance.

In addition, the latter method has a problem that a hole is undesirably defined in the filter disk when the grooves on the front surface and the rear surface are defined at a position where the grooves overlap each other in the thickness direction of the filter disk.

On the other hand, PTL 2 discloses a metal filter in which a curved groove is provided to the surface of a metal plate member. With such a filter having the above-mentioned configuration, the aperture ratio on the outer periphery side can be increased while avoiding the above-mentioned two problem defect.

However, with the curved groove disclosed in PTL 2, it is difficult to limit pressure drop (in other words, the pipe resistance of a channel defined by a groove), in comparison with the case of a straight groove.

In particular, increase in pressure drop cannot be avoided in the case where the curvature change of a groove is abrupt as with groove 8c disclosed in FIG. 10 and groove 8e disclosed in FIG. 11 in PTL 2, and in the case where the groove is unnecessarily long as in FIG. 12 of PTL 2.

Therefore, as with the case of the disk filter having the straight groove, the filter disclosed in PTL 2 also requires a high pressure pump to appropriately perform filtration when the resulting pressure drop is taken into account. As described, even when the aperture ratio is increased with the above-mentioned grooves, the pressure drop may not have been decreased.

CITATION LIST

Patent Literature

PTL 1
Japanese Patent Application Laid-Open No. 3-47505
PTL 2
Japanese Patent Application Laid-Open No. 2004-181272

SUMMARY OF INVENTION

Technical Problem

An object of the present invention is to provide a disk filter which achieves low pressure drop, has a high aperture ratio, and can properly and efficiently filter low pressure liquid, and to provide a filter disk used for the disk filter.

Solution to Problem

To achieve the above-described objects, the present invention provides the disk filter described below.

[1] A disk filter including: a filter case including an inlet and an outlet for liquid; an elongated center shaft disposed in the filter case; and a plurality of filter disks detachably housed in the filter case, the filter disks each having an annular plate shape and a predetermined thickness, wherein the filter disks are stacked on one another, with the center shaft inserted in a hole of each of the filter disks, each filter disk includes a plurality of grooves that connect an outer periphery and an inner periphery of the filter disk and define a liquid channel, the grooves being provided on at least one of a front surface and a rear surface of the filter disk at a predetermined interval in a circumferential direction of the filter disk, each groove is defined in a curved shape whose curvature gradually increases from the outer periphery toward the inner periphery, and a width of an opening of each groove in the circumferential direction at the outer periphery is greater than a width of an opening of the groove in the circumferential direction at the inner periphery.

[2] The disk filter according to [1], wherein the curved shape a clothoid curve.

[3] The disk filter according to [1], wherein the curved shape is an involute curve.

[4] The disk filter according to [1], wherein the curved shape is a cycloid curve.

[5] The disk filter according to any one of [1] to [4], wherein each filter disk includes grooves provided on both of the front surface and the rear surface, and a shape of each groove on the front surface is different in plan view from a shape of each groove of the rear surface.

[6] The disk filter according to [5], wherein each groove of the front surface and each groove of the rear surface are so defined as to extend in one direction in the circumferential direction from the outer periphery toward the inner periphery.

[7] A filter disk that is used for the disk filter according to any one of [1] to [6], the filter disk having a predetermined thickness and an annular plate shape, wherein the filter disk includes a plurality of grooves that connect an outer periphery and an inner periphery of the filter disk and define a liquid channel, the grooves being provided to at least one of a front surface and a rear surface of the filter disk at a predetermined interval in a circumferential direction of the filter disk, each groove is defined in a curved shape whose curvature gradually increases from the outer periphery toward the inner periphery, and a width of an opening of the each groove in the circumferential direction at the outer periphery is greater than a width of an opening of each groove in the circumferential direction at the inner periphery.

Advantageous Effects of Invention

Since the pressure drop of the channel is low and the aperture ratio of the channel is high in an embodiment of the present invention, low pressure liquid can be properly and efficiently filtered.

With the invention according to [1], the curvature of the shape of the groove gradually increases from the outer periphery toward the inner periphery of the filter disk, and the width of the opening of the groove at the outer periphery is greater than the width of the opening of the groove at the inner periphery. Thus, the aperture ratio on the outer periphery side of the filter disk can be increased, and increase in pressure drop due to abrupt directional change of the channel defined by the groove can be limited.

With the invention according to [2], a moderation curve suitable for moderating the directional change of the channel in the direction from the outer periphery side toward the inner circumference side is selected. Thus, the pressure drop can be effectively limited.

With the invention according to [3], the pressure drop can be limited by moderating the abrupt directional change of the channel in the direction from the outer periphery side toward the inner circumference side, and the flow speed of fluid on the inner circumference side of the channel is reduced. Consequently the function of capturing foreign matters in the groove can be enhanced.

With the invention according to [4], a moderation curve as with a clothoid curve is selected. Thus, the pressure drop can be effectively limited, and the flow speed of fluid in the channel can be maintained at a high speed to limit proliferation of biofilm.

With the invention according to [5], in plan view, mesh-shaped channels defined by the grooves that cross with one another are defined between adjacent two filter disks stacked on each other around the center shaft. Thus, the function of capturing foreign matters in the groove can be enhanced.

With the invention according to [6], it is possible to align the directions of the curves of the channels that are defined by the grooves of adjacent filter disks stacked on one another in such a manner as to cross one another in plan view. Thus, even when liquid flows from the channel defined by the groove of one of the filter disks into the channel defined by the groove of the other of the filter disks at the crossing points of the channels, abrupt directional change of the liquid can be limited so as to limit the increase in pressure drop.

With the invention according to [7], it is possible to achieve a disk filter with an increased aperture ratio that can limit pressure drop, with a simple configuration.

DESCRIPTION OF EMBODIMENTS

In the following, a disk filter and a filter disk used for the disk filter according to an embodiment of the present invention will be described with reference to FIGS. 1 to 9.

Figure 1:
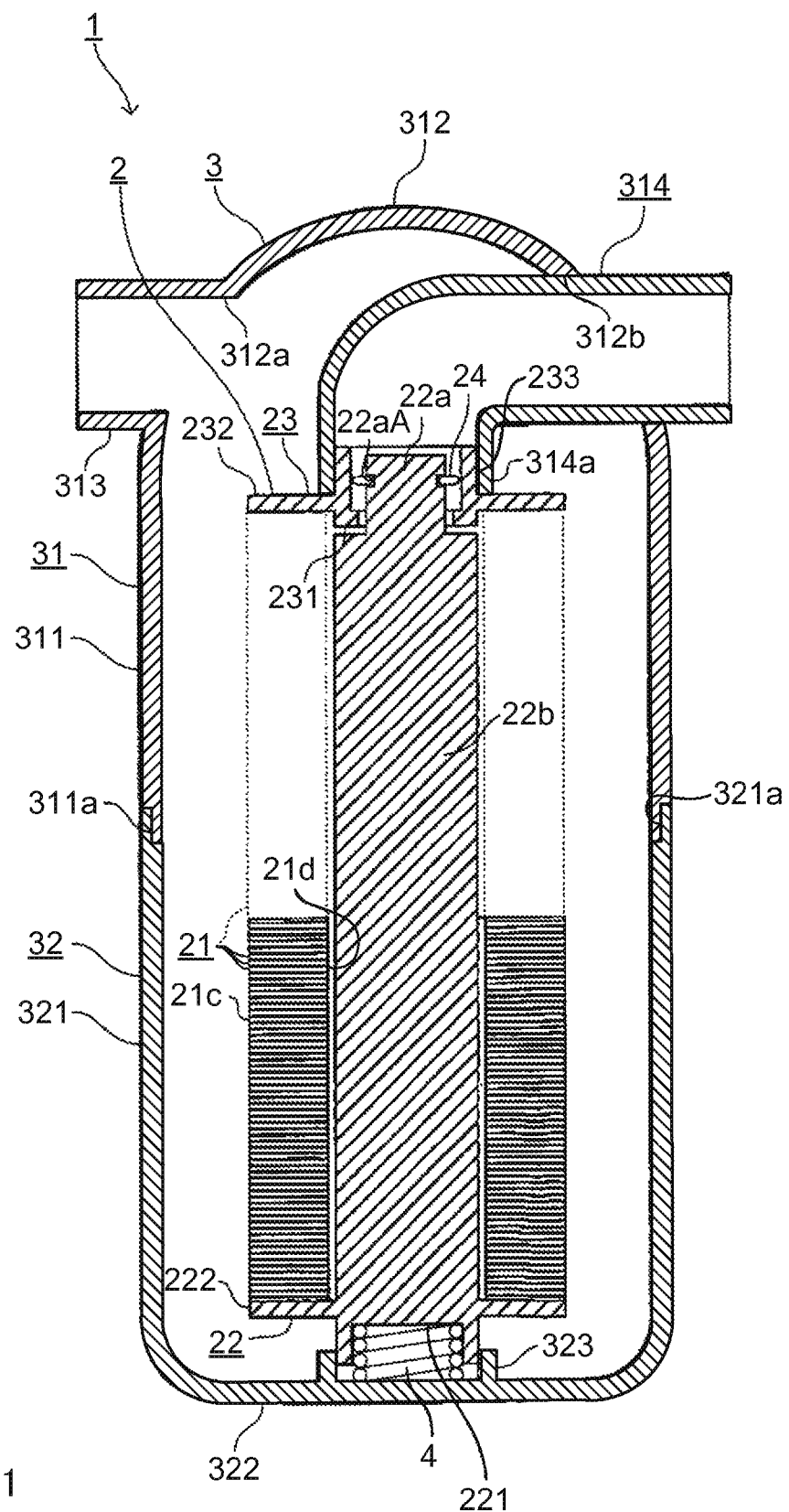
FIG. 1 is a cross sectional view schematically illustrating a disk filter according to an embodiment of the present invention.
Figure 2:
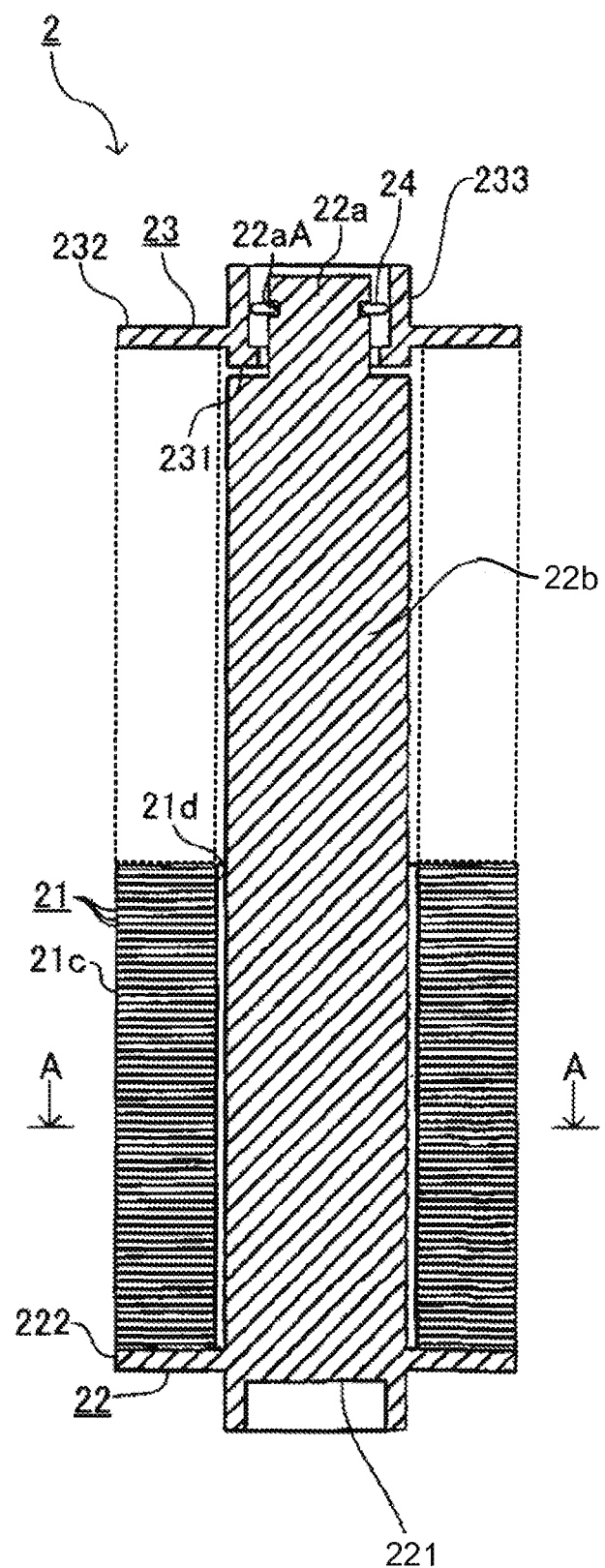
FIG. 2 is a cross sectional view schematically illustrating a filter cartridge in the disk filter illustrated in FIG. 1.
Figure 3:
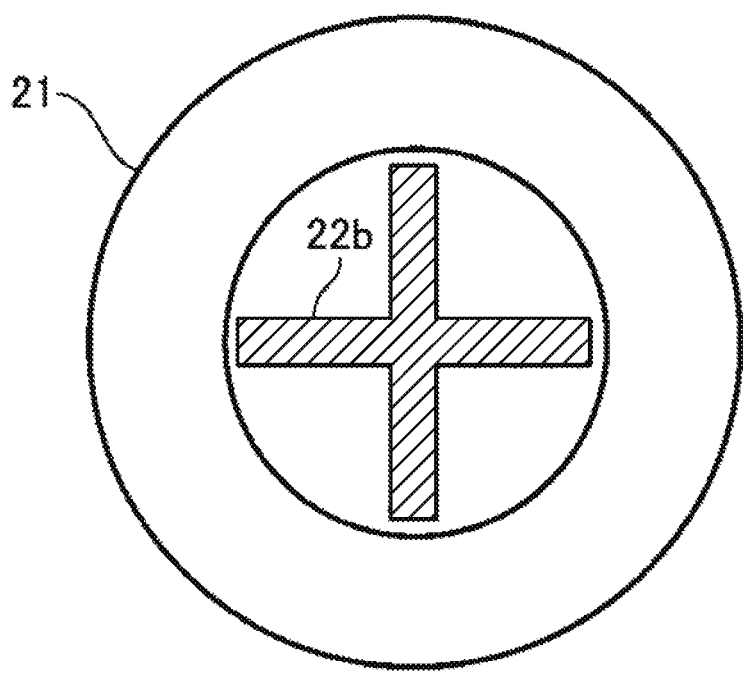
FIG. 3 is a cross sectional view illustrating the filter cartridge illustrated in FIG. 1 taken along line A-A in FIG. 2.
Figure 4:
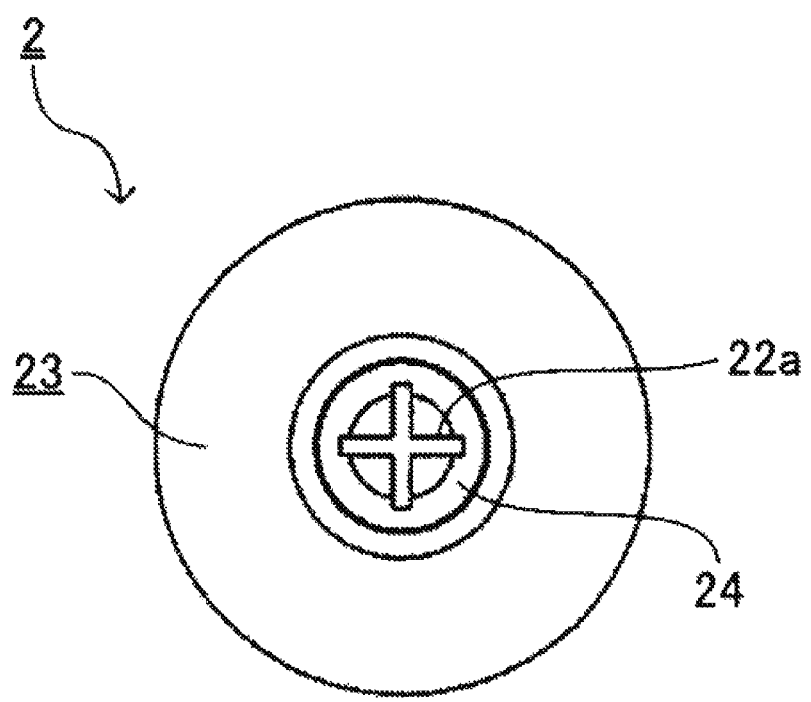
FIG. 4 is a plan view of the filter cartridge illustrated in FIG. 1.
Figure 5:
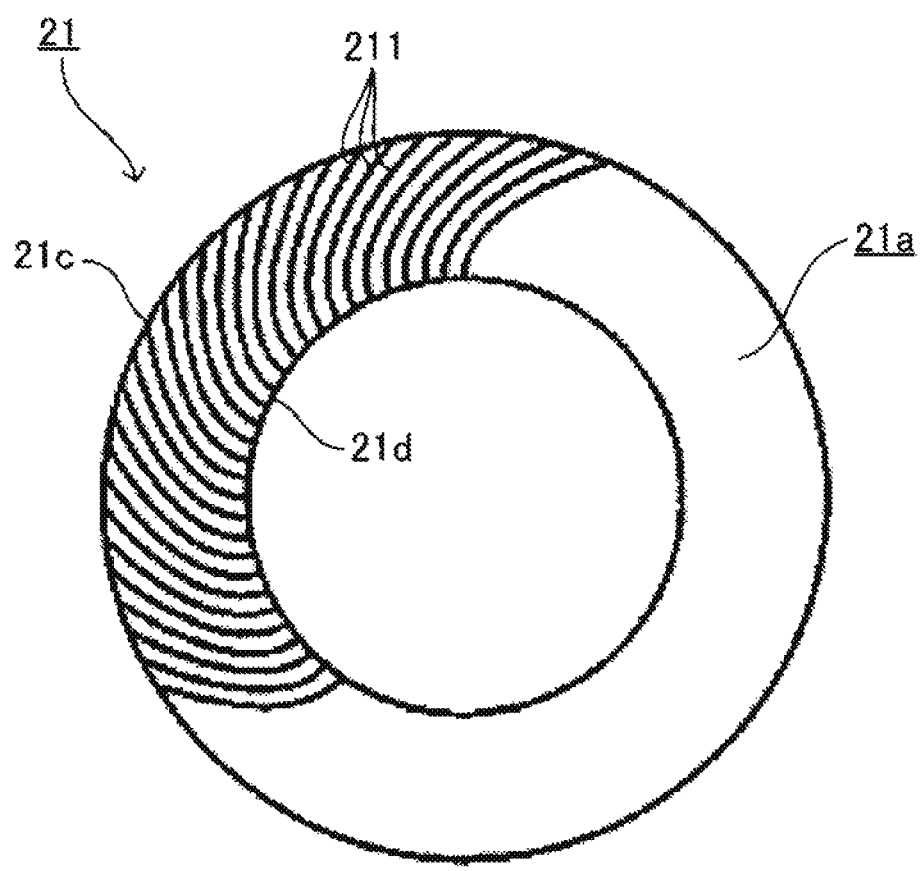
FIG. 5 is a plan view schematically illustrating the filter disk in the disk filter in FIG. 1.
Figure 6:
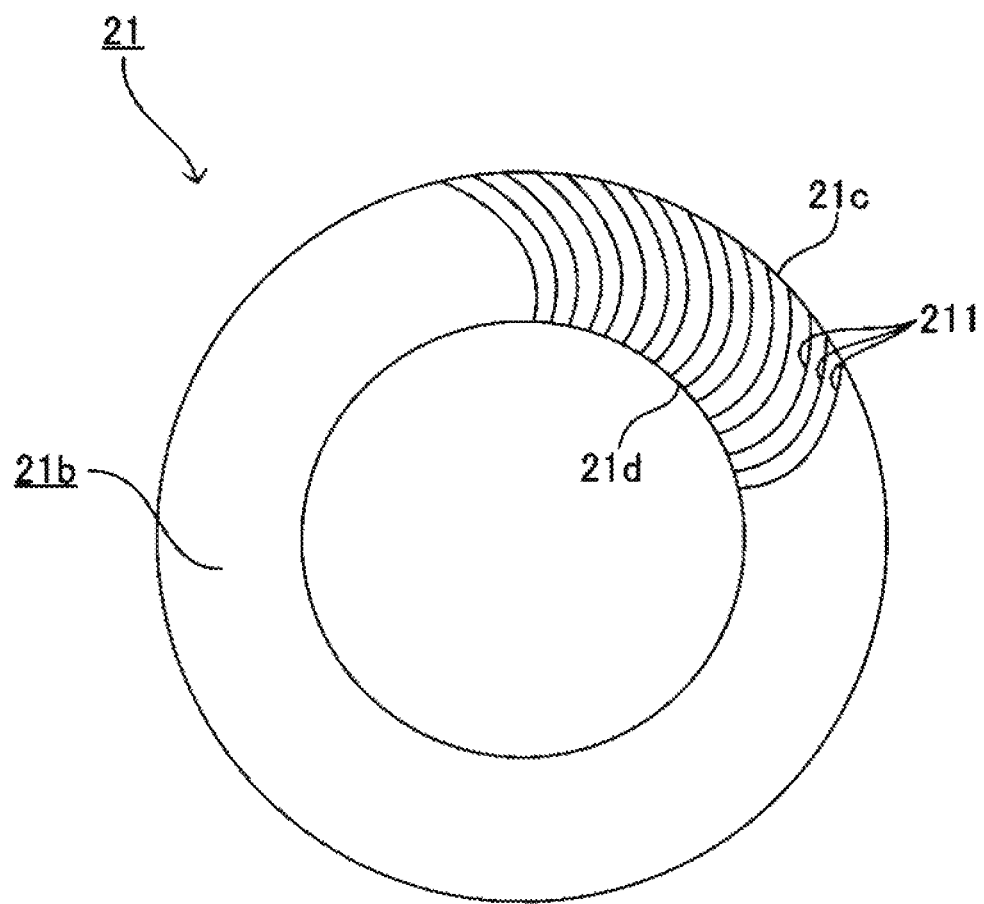
FIG. 6 is a bottom view schematically illustrating the filter disk of FIG. 5.

FIG. 1 is a longitudinal sectional view schematically illustrating disk filter 1 of the embodiment. FIG. 2 is a sectional view schematically illustrating filter cartridge 2 in disk filter 1 of FIG. 1. FIG. 3 is a sectional view of filter cartridge 2 of FIG. 2 taken along line A-A. FIG. 4 is a plan view of filter cartridge 2 of FIG. 2. FIG. 5 is a plan view illustrating filter disk 21 of the embodiment mounted to filter cartridge 2 in disk filter 1 of FIG. 1. FIG. 6 is a bottom view of filter disk 21 of FIG. 5.

As illustrated in FIG. 1, disk filter 1 mainly includes hollow filter case 3, filter cartridge 2 detachably (removably) housed in filter case 3, and compression spring 4 that holds filter cartridge 2 in filter case 3 by the biasing force.

[Details of Configuration of Filter Case]

As illustrated in FIG. 1, filter case 3 includes upper case 31 and lower case 32. Upper case 31 and lower case 32 may be formed of a resin material such as polypropyrene.

First, upper case 31 is specifically described. As illustrated in FIG. 1, upper case 31 includes outer peripheral wall 311 having a cylindrical shape, and top wall 312 continuously connected with an upper end portion of outer peripheral wall 311. Top wall 312 has a hemisphere shell shape.

As illustrated in FIG. 1, top wall 312 is provided with opening parts 312a and 312b at left and right portions in FIG. 1, respectively. Opening parts 312a and 312b are respectively provided with cylindrical parts 313 and 314 that extend toward the outside of upper case 31. Cylindrical parts 313 and 314 are provided as a pair.

Of cylindrical parts 313 and 314, cylindrical part 313 shown on the left side in FIG. 1 is inlet 313 from which liquid supplied from a liquid supply source flows into a channel of disk filter 1. The outer peripheral surface of inlet 313 may have a screw groove for threadedly engaging a pipe on the upstream side, which is the liquid supply source side. It is to be noted that examples of the liquid include water pumped up from the water source by a pump, and mixture of water and liquid fertilizer.

On the other hand, cylindrical part 314 shown on the right side in FIG. 1 is outlet 314 from which liquid having entered from inlet 313 is ejected out of the channel of disk filter 1 after filtration at disk filter 1. As illustrated in FIG. 1, outlet 314 extends also to the inside of upper case 31 from opening part 312b. Starting end portion 314a of outlet 314 is an end portion of a part of cylindrical part 314 disposed in upper case 31 which is bent downward at a right angle. Starting end portion 314a is located at the center in upper case 31. Starting end portion 314a functions also as a holding section that holds filter cartridge 2 by pressing filter cartridge 2 from the upper side. An outer peripheral surface of outlet 314 on the end portion side of (end portion outside of upper case 31) may have a screw groove for threadedly engaging a pipe on the downstream side to which filtered liquid is supplied.

In addition, as illustrated in FIG. 1, an outer peripheral surface at a lower end portion of outer peripheral wall 311 is provided with male screw part 311a for threadedly engaging lower case 32.

Next, lower case 32 is specifically described. As illustrated in FIG. 1, lower case 32 includes outer peripheral wall 321 having a cylindrical shape, and disk-shaped round bottom wall 322 continuously connected to a lower end portion of outer peripheral wall 321. It is to be noted that the size of the inner diameter of outer peripheral wall 321 may be same as that of outer peripheral wall 311 of upper case 31.

In addition, as illustrated in FIG. 1, at a center portion on the top surface of bottom wall 322, spring receiver 323 that supports compression spring 4 from the lower side is disposed.

Further, as illustrated in FIG. 1, the inner peripheral surface at an upper end portion of outer peripheral wall 321 is provided with female screw part 321a for threadedly engaging upper case 31 with outer peripheral wall 321. It should be noted that the structure for joining outer peripheral wall 321 to upper case 31 is not limited to the above-described structure of the screw parts. For example, the lower end portion of upper case 31 and the upper end portion of lower case 32 may be provided with a female screw part and a male screw part, respectively.

[Details of Configuration of Filter Cartridge]

As illustrated in FIG. 1 to FIG. 4, filter cartridge 2 includes a plurality of filter disks 21, center shaft 22, pressing flange 23, and retainer 24. Filter disks 21 are plate-shaped annular filters each having a predetermined thickness. Filter disks 21 are detachably fitted around center shaft 22. Pressing flange 23 presses filter disks 21 fitted around center shaft 22 from the upper side (upper case 31 side). Retainer 24 prevents pressing flange 23 and filter disks 21 from dropping from center shaft 22.

To be more specific, as illustrated in FIG. 1 and FIG. 2, filter disks 21 are stacked along the longitudinal direction of vertically long center shaft 22, and disposed around the outer periphery of center shaft 22. The longitudinal direction of center shaft 22 corresponds to the thickness direction of filter disks 21. Filter disks 21 may be formed of a resin material such as polypropylene, and in addition, may have the same size.

In addition, as illustrated in FIG. 1 and FIG. 2, recess 221 recessed upward is formed at the lower end portion of center shaft 22. Compression spring 4 supported by spring receiver 323 is fitted in recess 221.

Further, as illustrated in FIG. 1 and FIG. 2, annular flange part 222 that outwardly protrudes in the radial direction of center shaft 22 is disposed at the lower end portion of center shaft 22. Flange part 222 supports each filter disk 21 from the lower side.

As illustrated in FIG. 1, FIG. 2 and FIG. 4, part (also referred to as "upper end part") 22a of center shaft 22 in a predetermined range on the upper end side thereof has a cross shape as viewed in lateral cross section. The outer end of upper end part 22a in the radial direction (short direction) is located on the inner side relative to the outer end of the other portion (hereinafter referred to as "main body part") 22b of center shaft 22 in the short direction.

In addition, as illustrated in FIG. 3, main body part 22b of center shaft 22 has a cross shape as viewed in lateral cross section. The cross shape of main body part 22b is disposed at a position overlapping the cross shape of upper end part 22a. The cross shape of main body part 22b may have a width greater than that of upper end part 22a. For example, main body part 22b may have a thickness greater than that of upper end part 22a, and may be more protruding from central axis of center shaft 22 than upper end part 22a. The outer diameter (or the length of the part protruding from the central axis) of main body part 22b is slightly smaller than the inner diameter of filter disks 21 so that filter disks 21 can be easily detached.

The above-described cross-shaped center shaft 22 defines a liquid channel (a space in communication with outlet 314) between filter disks 21 and outlet 314.

Further, as illustrated in FIG. 1 and FIG. 2, pressing flange 23 includes annular small flange part 231, cylinder part 233, and annular large flange part 232. Cylinder part 233 is joined with small flange part 231 at the outer peripheral edge of small flange part 231. Large flange part 232 outwardly protrudes from the outer peripheral surface of cylinder part 233. Small flange part 231 is joined to the inner periphery of cylinder part 233 at the lower end thereof. Large flange part 232 is disposed above small flange part 231. Small flange part 231, large flange part 232 and cylinder part 233 are coaxially disposed. It should be noted that the positional relationship between small flange part 231 and large flange part 232 in the vertical direction may be reversed. The inner diameter of small flange part 231 is slightly greater than the outer diameter of upper end part 22a of center shaft 22. The size of the outer diameter of small flange part 231 may be same as that of the outer diameter of main body part 22b of center shaft 22. In addition, the inner diameter of large flange part 232 is same as the outer diameter of small flange part 231. The outer diameter of large flange part 232 is substantially the same as the outer diameter of filter disks 21. Further, the outer diameter of cylinder part 233 is the same as the outer diameter of small flange part 231, and is slightly smaller than the inner diameter of starting end portion 314a of outlet 314.

As illustrated in FIG. 1, pressing flange 23 is disposed on the outside of upper end part 22a of center shaft 22, and inserted to starting end portion 314a of outlet 314. Further, pressing flange 23 presses filter disks 21 by the biasing force of compression spring 4 transmitted through filter disks 21 from the lower side, so as to hold filter disks 21. That is, large flange part 232 is brought into pressure contact with starting end portion 314a by the biasing force, and the reaction force against the biasing force presses large flange part 232 against filter disks 21.

Furthermore, as illustrated in FIG. 1 and FIG. 2, groove 22aA for retainer 24 is defined at upper end part 22a of center shaft 22. Retainer 24 is locked in groove 22aA. It is to be noted that retainer 24 may be the same as that disclosed in PTL 1.

Filter cartridge 2 can be housed in filter case 3 in the following manner. First, compression spring 4 is disposed on spring receiver 323 of lower case 32. Next, filter cartridge 2 is placed in lower case 32 such that compression spring 4 is fitted into recess 221 of center shaft 22. Thereafter, upper case 31 is threadedly engaged with lower case 32. In the process of this thread engagement, starting end portion 314a of outlet 314 makes contact with large flange part 232 while upper case 31 is threadedly engaged with lower case 32. As a result, by the pressing of large flange part 232 against filter disks 21, compression spring 4 is gradually pushed into spring receiver 323. Then, when filter cartridge 2 is housed by threadedly engaging upper case 31 with lower case 32, filter disks 21 adjacent to (stacked on) each other in the thickness direction are pressed against each other by the biasing force of compression spring 4. Thus, starting end portion 314a of outlet 314 makes tight contact with large flange part 232. As a result, inlet 313 and outlet 314 are partitioned such that liquid having entered from inlet 313 cannot flow into outlet 314 without passing through a channel defined by grooves 211 of filter disks 21 described later.

[Filter Disk]

As illustrated in FIG. 5 to FIG. 8, each filter disk 21 mounted on filter cartridge 2 includes, at front surface 21a and rear surface 21b, a plurality of grooves 211 for defining liquid channels extending from the outer periphery side toward the inner circumference side.

Groove 211 is defined in such a manner as to extend from the outer peripheral edge to the inner peripheral edge of front surface 21a or rear surface 21b, and is radially disposed in a circumferential direction of front surface 21a or rear surface 21b at even intervals.

Figure 7:
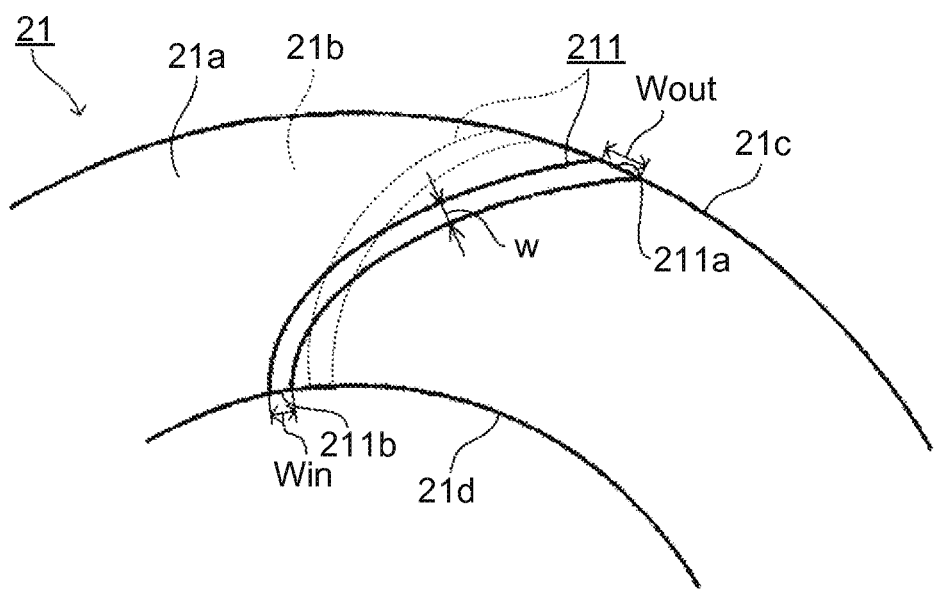
FIG. 7 is an enlarged view schematically illustrating a part of the filter disk of FIG. 5.
Figure 8:
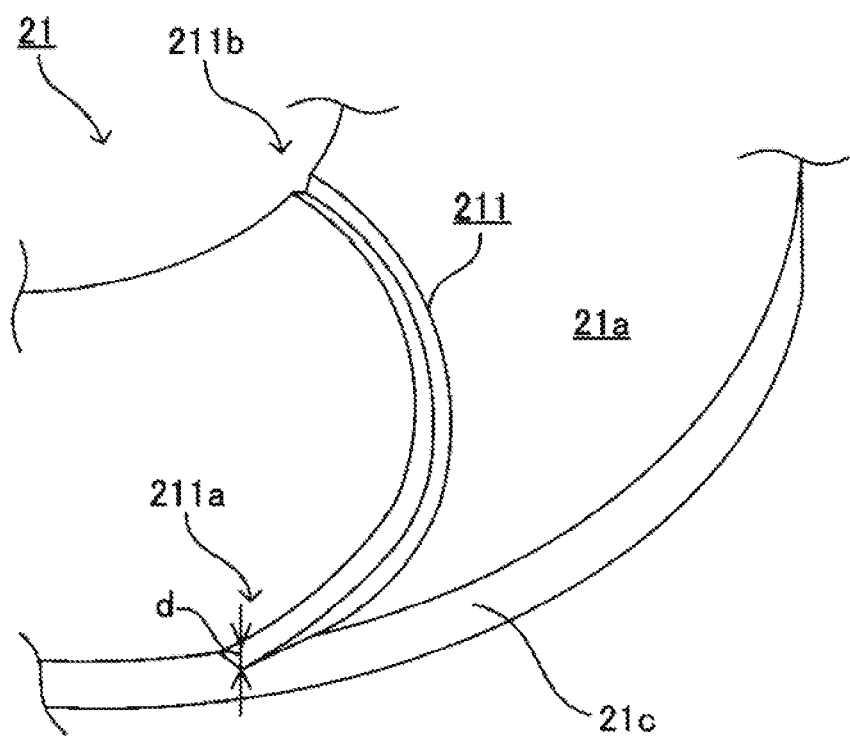
FIG. 8 is an enlarged perspective view schematically illustrating a part of the filter disk of FIG. 5.

As illustrated in FIG. 7 and FIG. 8, groove 211 is defined in a shape that extends along a predetermined curve. The shape having the predetermined curve is a shape whose curvature gradually increases from the outer end side toward the inner end side. That is, groove 211 has a shape whose angle gradually changes from an angle oblique to the radial direction of filter disks 21, to an angle in parallel with the radial direction of filter disks 21. Groove 211 has constant width w and constant depth d. Width w of groove 211 is the distance between both ends of groove 211 in a direction orthogonal to the curve, and depth d of groove 211 is the distance between front surface 21a of filter disks 21 and the bottom of groove 211 or between rear surface 21b of filter disks 21 and the bottom of groove 211. It is to be noted that the angle of groove 211 may be in parallel with the radial direction at the inner peripheral edge of filter disks 21.

As illustrated in FIG. 7 and FIG. 8, opening part 211a on the outer periphery side of groove 211 is provided at outer peripheral surface 21c of the cylindrical shape of filter disks 21 by cutting out outer peripheral surface 21c. Opening part 211b on the inner circumference side of groove 211 is provided at inner peripheral surface 21d of the cylindrical shape of filter disks 21 by cutting out inner peripheral surface 21d.

Thus, as illustrated in FIG. 7 and FIG. 8, opening width Wout (maximum width of v-shaped opening part 211a) of opening part 211a on the outer periphery side along the circumferential direction of filter disks 21 is greater than opening width Win (maximum width of v-shaped opening part 211b) of opening part 211b on the inner circumference side along the above-mentioned circumferential direction.

As described above, in the state where filter disks 21 are brought into pressure contact with one another by the biasing force of compression spring 4, groove 211 of one of filter disks 21 is covered by front surface 21a or rear surface 21b of adjacent filter disk 21 in the thickness direction of filter disks 21. In this manner, the liquid channels extending from the outer periphery side toward the inner circumference side are defined between groove 211 and front surface 21a or rear surface 21b.

In addition, as illustrated in FIG. 7, the curvature change of groove 211 of front surface 21a extending from the outer periphery side toward the inner circumference side of filter disks 21 is different from the curvature change of groove 211 of rear surface 21b. That is, in plan view, the shape of groove 211 of front surface 21a is different from that of rear surface 21b. Thus, between adjacent two filter disks 21 stacked on each other, mesh-shaped (or in other words, lattice-shaped) channels are defined in which groove 211 of rear surface 21b (which is shown by the broken line in FIG. 7, for example) of one of filter disks 21 and groove 211 of front surface 21a (which is shown by the solid line in FIG. 7, for example) of the other of filter disks 21 intersect with each other.

It is to be noted that the predetermined curve to be extended along groove 211 may be selected from the group consisting of clothoid curve, involute curve and cycloid curve.

In addition, as illustrated in FIG. 7, grooves 211 of front surface 21a and groove 211 of rear surface 21b may be defined in a shape that extends in one direction (counterclockwise in FIG. 7) in the circumferential direction of filter disks 21 from the outer periphery side toward the inner circumference side of filter disk 21. That is, when the direction in which the axial angle of groove 211 with respect to the radial line of filter disk 21 gradually decreases is defined as the direction of groove 211, the direction of groove 211 of front surface 21a may be the same as that of groove 211 of rear surface 21b in the circumferential direction of filter disks 211 (that is, clockwise or counterclockwise). In this manner, groove 211 of front surface 21a and groove 211 of rear surface 21b are so defined as to extend from the outer periphery toward the inner periphery of filter disks 21 along one direction in the circumferential direction of filter disks 21.

Further, grooves 211 of front surface 21a and rear surface 21b may have shapes extending along different portions of the same curve selected from the above-mentioned predetermined curves. Alternatively, grooves 211 of front surface 21a and rear surface 21b may have shapes extending along different curves (curves of the same kind having different sizes, or curves of different kinds) selected from the above-mentioned predetermined curves.

Furthermore, while groove 211 is a V-shaped groove in FIG. 7 and in FIG. 8, grooves other than the V-shaped groove may be employed as necessary.

Operation and Effect of Embodiment

Figure 9:
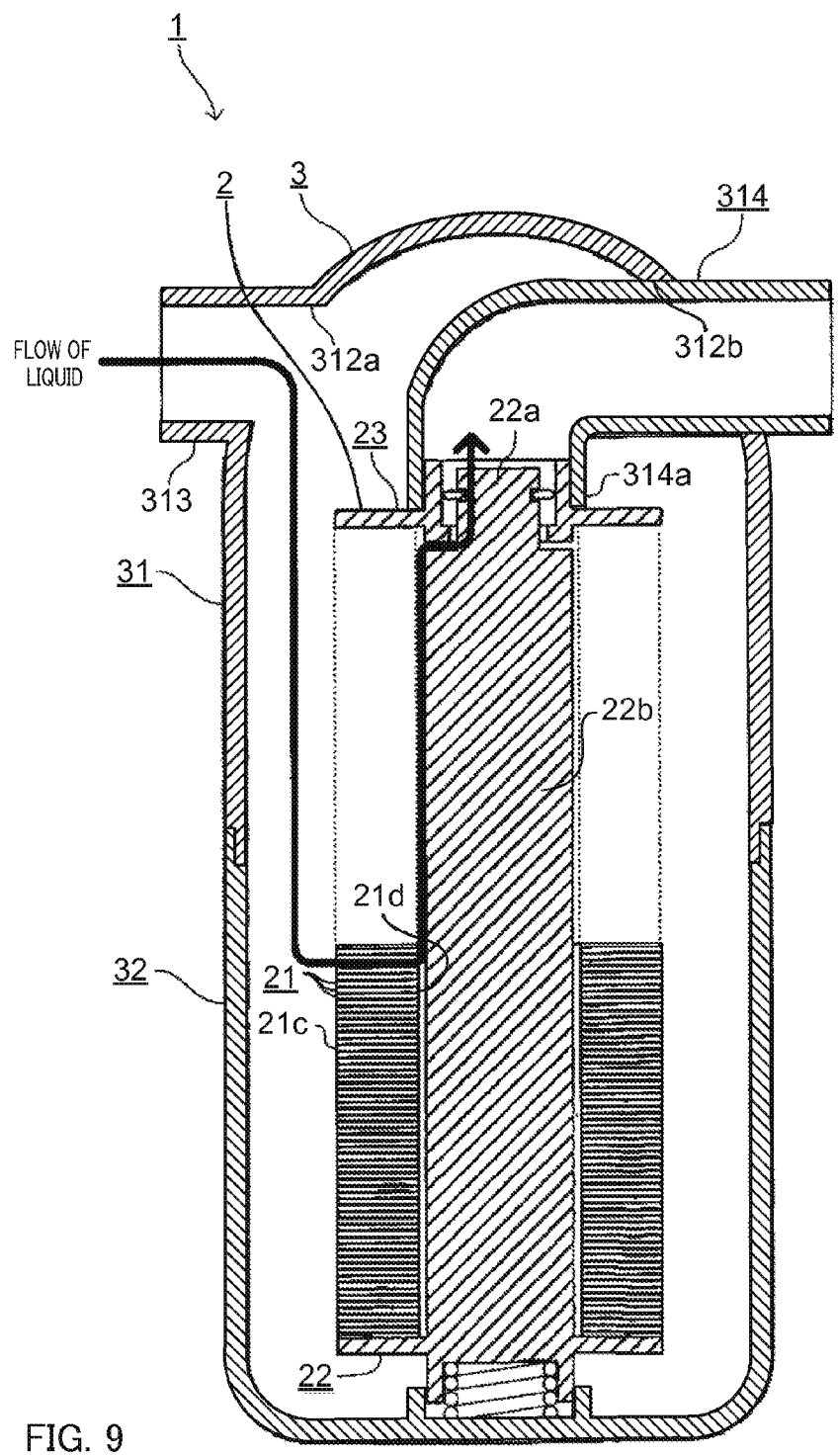
FIG. 9 schematically illustrates a liquid channel in the disk filter of FIG. 1.

In the embodiment, as indicated by the arrow in FIG. 9, liquid having entered disk filter 1 from inlet 313 is filtered at outer peripheral surfaces 21c of a plurality of filter disks 21 adjacent to one another. Foreign matters in the liquid are captured at outer peripheral surfaces 21c. The liquid flows into channels defined by grooves 211 that open to outer peripheral surfaces 21c.

Here, as illustrated in FIG. 7 and FIG. 8, opening width Wout at the outer end of groove 211 is large. Thus, even when the pressure of the liquid supplied from supply source (pump) side is low, the liquid can readily flow into the channel.

Next, the liquid having entered the channels advances in the channels toward inner peripheral surface 21d of filter disks 21. In the channels, grooves 211 form mesh-shaped channels between adjacent filter disks 21. Thus, foreign matters that have not captured at outer peripheral surfaces 21c are efficiently captured.

The channel is curved at a curvature which gradually changes and does not abruptly change the direction of the flow of the liquid. Thus, it is possible to prevent the increase in pressure drop in the channel.

For example, when groove 211 extends along a clothoid curve, pressure drop can be effectively limited since clothoid curves are suitable for gradually changing the direction of the channel. When groove 211 extends along an involute curve, pressure drop can be reduced by limiting abrupt directional change of the channel. Further, since the flow speed on the inner circumference side of the channel decreases, the function of capturing foreign matters in groove 211 can be enhanced. When groove 211 extends along a cycloid curve, pressure drop can be effectively limited as with the case of the clothoid curve. When groove 211 extends along a cycloid curve, the flow speed in the channel is maintained at a high speed, and proliferation of biofilm can be limited.

Next, the liquid in the channel is ejected out of the channel through opening part 211b of inner peripheral surface 21d of filter disks 21.

Then, the filtered liquid ejected out of the channel sequentially passes through a channel defined between filter disks 21 and main body part 22b of center shaft 22, and a channel defined between pressing flange 23 and upper end part 22a of center shaft 22, and is then ejected out of disk filter 1 from outlet 314.

It is to be noted that the disk filter and the filter disk according to the embodiment of the present invention are not limited to the above-described the embodiment, and various modifications may occur in so far as they are within the scope of the appended claims or the equivalents thereof.

For example, it is possible to provide groove 211 only to either of front surface 21a or rear surface 21b of filter disk 21.

It is possible to adjust the position or orientation of inlet 313 of filter case 3 such that liquid having entered from inlet 313 generates a cyclone flow in filter case 3. With this configuration, liquid can flow into the channel defined by groove 211 (on the starting end side) in the direction substantially in parallel with the axis direction of the channel. Thus, filtration can be promptly performed.

Further, the present invention is not limited to disk filters of the cartridge system. For example, the present invention can be applied to a disk filter in which filter disks 21 are fitted around a center shaft built in a case.

This application is entitled to and claims the benefit of Japanese Patent Application No. 2012-127024 dated Jun. 4, 2012, the disclosure of which including the specification, drawings and abstract is incorporated herein by reference in its entirety.

INDUSTRIAL APPLICABILITY

According to the present invention, it is possible to provide a disk filter which can limit pressure drop and can enhance filtration performance. The disk filter according to the embodiment of the present invention can be favorably used for filtration of low pressure liquid, such as filtration of irrigation liquid. Therefore, the present invention is expected to contribute to spread and develop businesses that require transfer of low pressure liquid, such as irrigation.

REFERENCE SIGNS LIST

1 Disk filter
3 Filter case
21 Filter disk
21a Front surface
21b Rear surface
211 Groove
313 Inlet
314 Outlet

The invention claimed is:

1. A disk filter comprising:
a filter case including an inlet and an outlet for liquid;
an elongated center shaft disposed in the filter case; and
a plurality of filter disks detachably housed in the filter case, the filter disks each having an annular plate shape and a predetermined thickness, wherein
the filter disks are stacked on one another, with the center shaft inserted in a hole radially-centered of each of the filter disks,
each filter disk includes
a plurality of grooves that connect an outer periphery and an inner periphery of the filter disk and define a liquid channel, the grooves being provided on at least one of a front surface and a rear surface of the filter disk at a predetermined interval in a circumferential direction of the filter disk,
each groove opens at an inner peripheral edge of the filter disk in a radial direction thereof and is defined in a curved shape whose curvature gradually increases from the outer periphery toward the inner periphery, and
a width of an opening of each groove in the circumferential direction at the outer periphery is greater than a width of an opening of the groove in the circumferential direction at the inner periphery.

2. The disk filter according to claim 1, wherein the curved shape is a clothoid curve.

3. The disk filter according to claim 1, wherein the curved shape is an involute curve.

4. The disk filter according to claim 1, wherein the curved shape is a cycloid curve.

5. The disk filter according to claim 1, wherein
each filter disk includes grooves provided on both of the front surface and the rear surface, and a shape of each groove on the front surface is different in plan view from a shape of each groove on the rear surface.

6. The disk filter according to claim 5, wherein each groove on the front surface and each groove on the rear surface are so defined as to extend in one direction in the circumferential direction from the outer periphery toward the inner periphery.

7. A filter disk that is used for the disk filter according to claim 1, the filter disk having a predetermined thickness and an annular plate shape, wherein the filter disk includes a plurality of grooves that connect an outer periphery and an inner periphery of the filter disk and define a liquid channel, the grooves being provided to at least one of a front surface and a rear surface of the filter disk at a predetermined interval in a circumferential direction of the filter disk, each groove opens at an inner peripheral edge of the filter disk in a radial direction thereof and is defined in a curved shape whose curvature gradually increases from the outer periphery toward the inner periphery, and a width of an opening of each of the grooves in the circumferential direction at the outer periphery is greater than a width of an opening of each of the grooves in the circumferential direction at the inner periphery.

8. The disk filter according to claim 1, wherein the inlet is configured to generate a cyclone flow of a liquid entering from the inlet into the filter case.

* * * * *